US007581168B2

(12) United States Patent
Boon

(10) Patent No.: US 7,581,168 B2
(45) Date of Patent: Aug. 25, 2009

(54) METHOD, SYSTEM, AND COMPUTER-READABLE MEDIUM FOR DETERMINING WHETHER TO REPRODUCE CHART IMAGES CALCULATED FROM A WORKBOOK

(75) Inventor: Sean M. Boon, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 11/019,059

(22) Filed: Dec. 20, 2004

(65) Prior Publication Data

US 2006/0136535 A1  Jun. 22, 2006

(51) Int. Cl.
*G06F 15/00* (2006.01)
*G06F 17/00* (2006.01)

(52) U.S. Cl. .............. 715/215; 715/212; 715/234; 715/760; 707/3; 707/100; 707/103 R; 709/203; 709/217

(58) Field of Classification Search ............. 715/200, 715/201, 204, 205, 210, 212, 213, 215, 219, 715/220, 231, 234, 238, 243, 255, 273, 274, 715/729, 730, 760, 783; 707/1, 3, 4, 10, 707/100, 102, 103 R, 2, 203, 205; 709/201, 709/203, 217, 218, 219
See application file for complete search history.

(56) References Cited

U.S. PATENT DOCUMENTS 5,598,519 A * 1/1997 Narayanan ............... 715/219
6,181,342 B1 * 1/2001 Niblack .................... 345/635
6,519,764 B1 * 2/2003 Atkinson et al. ........... 717/120
6,549,878 B1 * 4/2003 Lowry et al. .............. 715/219
6,626,959 B1 * 9/2003 Moise et al. .............. 715/210
6,801,201 B2 * 10/2004 Escher .................... 705/36 R
6,920,608 B1 * 7/2005 Davis ..................... 715/209
7,266,773 B2 * 9/2007 Dorwart ................... 715/731
7,363,583 B1 * 4/2008 Costa ..................... 715/734
2003/0131315 A1 * 7/2003 Escher .................... 715/512
2005/0234908 A1 * 10/2005 Lowrance et al. ............ 707/8

OTHER PUBLICATIONS

Hyvonen et al., "A New Basis for Spreadsheet Computing," Interval Solver for Microsoft Excel, Google 1999, pp. 1-8.*

* cited by examiner

*Primary Examiner*—Laurie Ries
*Assistant Examiner*—MaiKhanh Nguyen
(74) *Attorney, Agent, or Firm*—Merchant & Gould, P.C.

(57) ABSTRACT

A method, system, and computer-readable medium are provided for determining whether to reproduce a chart image from the contents of a spreadsheet application workbook on a server. A calculation server calculates chart data for defining a chart image from workbook data retrieved from the spreadsheet application workbook, generates a representation of the chart data, and calculates an identifier for the representation of the chart data. A charting component receives the representation of the chart data and the identifier from the calculation server and compares the calculated identifier to a previously stored identifier on the server. If the calculated identifier is equal to the previously stored identifier, then the charting component retrieves a previously produced chart image from the representation of the chart data from the server. If the calculated identifier is not equal to the previously stored identifier, then the charting component produces a chart image from the representation of the chart data.

11 Claims, 5 Drawing Sheets

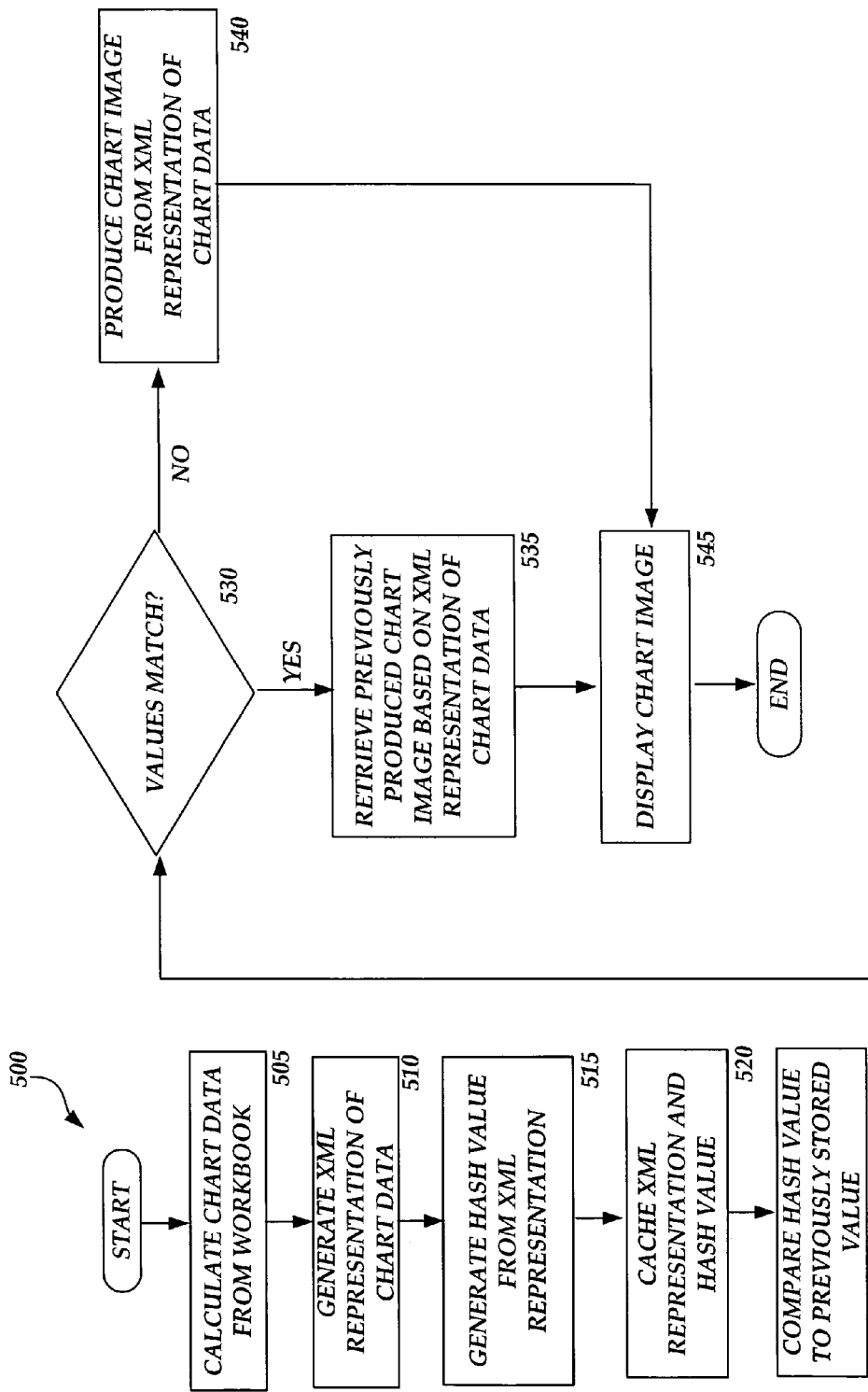

METHOD, SYSTEM, AND COMPUTER-READABLE MEDIUM FOR DETERMINING WHETHER TO REPRODUCE CHART IMAGES CALCULATED FROM A WORKBOOK

BACKGROUND OF THE INVENTION

Charting programs, such as spreadsheet application programs, enable users to create charts from underlying data in a workbook. In order share charts with other users in a computer network, a user may save a copy of the workbook to a server computer which is accessible by multiple users via connected computers over the network. Users wishing to view charts created from the workbook may access a charting application program running on the server computer which retrieves and calculates the data from the workbook and generates a chart for display on one or more remotely connected computers.

Generating charts from workbook data on a server in a network environment, however, suffers from a number of drawbacks. First, the charting application program running on the server must utilize calculation and memory resources to recalculate underlying workbook data and render chart images for display to multiple users, each time a chart request is made from one or more client computers in the network. Second, these calculation and memory resources are used even when there hasn't been a change to the underlying workbook data (and thus no change in the chart to be rendered for display). Thus, a server fielding multiple chart requests often results in a taxing and often unnecessary utilization of server resources.

It is with respect to these considerations and others that the various embodiments of the present invention have been made.

BRIEF SUMMARY OF THE INVENTION

In accordance with the present invention, the above and other problems are solved by a method, system, and computer-readable medium for determining whether to reproduce a chart image from the contents of a spreadsheet application workbook on a server. According to one aspect of the invention, a calculation server calculates chart data for defining a chart image from workbook data retrieved from the spreadsheet application workbook, generates a representation of the chart data, and calculates an identifier for the representation of the chart data. A charting component receives the representation of the chart data and the identifier from the calculation server and compares the calculated identifier to a previously stored identifier on the server. If the calculated identifier is equal to the previously stored identifier, then the charting component retrieves a previously produced chart image from the representation of the chart data from the server. If the calculated identifier is not equal to the previously stored identifier, then the charting component produces a chart image from the representation of the chart data.

The above-described method may further include displaying the retrieved chart image in a web browser and caching the representation of the chart data and the calculated identifier. The identifier for the representation of the chart data may be determined by generating a hash value or key from the representation of the chart data. The representation of the chart data may be an extensible markup language (XML) representation of the chart data. The XML representation of the chart data may include individual chart series points and values associated with the chart series points. The chart data may also include pivotChart data.

Other aspects of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIG. 5 is a flow diagram illustrating aspects of a process for determining whether to reproduce chart images calculated from a workbook, according to an illustrative embodiment of the invention.

DETAILED DESCRIPTION OF THE INVENTION

Figure 1:
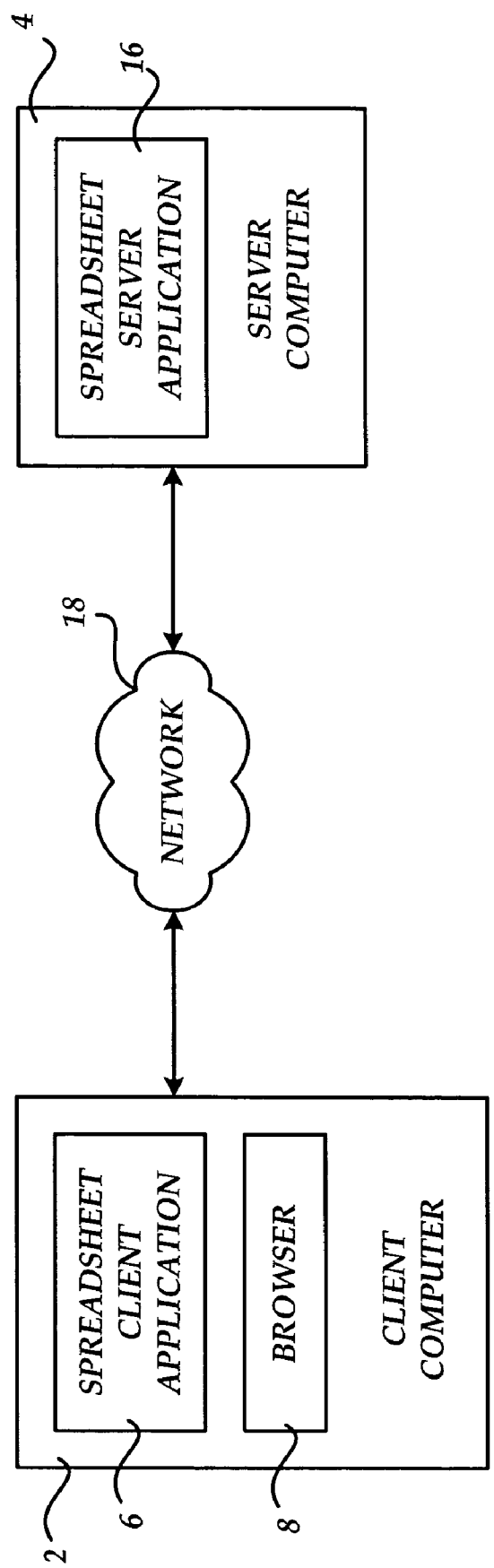
FIG. 1 is a computer network diagram illustrating aspects of several computer systems utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the several embodiments of the invention will be described. As shown in FIG. 1, a network 18 interconnects a client computer 2 and a server computer 4. It should be appreciated that the network 18 may comprise any type of computing network, including a local area network or a wide area network, such as the Internet. The network 18 provides a medium for enabling communication between the client computer 2, the server computer 4, and potentially other computer systems connected to or accessible through the network 18.

The client computer 2 comprises a general purpose desktop or laptop computer capable of executing one or more application programs. In particular, according to the various embodiments of the invention, the computer 2 is operative to execute a spreadsheet client application 6. As known to those skilled in the art, the spreadsheet client application program 6 provides functionality for performing a number of numeric-related tasks. In order to provide this functionality, data values may be organized using cells and the relationships between the cells may be defined using formulas which may include various mathematical functions. A change to one cell produces changes to related cells. Spreadsheet programs usually provide graphing capabilities for generating charts and a variety of formatting options for text, numeric values, and graph features.

According to embodiments of the invention, the computer 2 may also include a browser program 8 for viewing web pages over the network 18. The browser 8 may comprise the INTERNET EXPLORER browser program from MICROSOFT CORPORATION of Redmond, Wash. As will be discussed more fully herein, the browser 8 may be utilized in various embodiments of the invention to view chart images saved as by a spreadsheet server application program running on the server computer 4 over the network 18. The files saved by the spreadsheet server application program may be saved in a number of file formats known to those skilled in the art including, but not limited to, .PNG, .JPG, .GIF, and .BMP files.

The server computer 4 includes a spreadsheet server application 16 for generating charts from provided workbook data. The spreadsheet server application 16 comprises a server-based application program that may execute without the use of a display screen (headless). It should be appreciated that, according to one embodiment of the invention, the spreadsheet client application 16 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention. Additional details regarding the various functions performed by the spreadsheet server application 16 will be provided below with respect to FIGS. 2-5.

Figure 2:
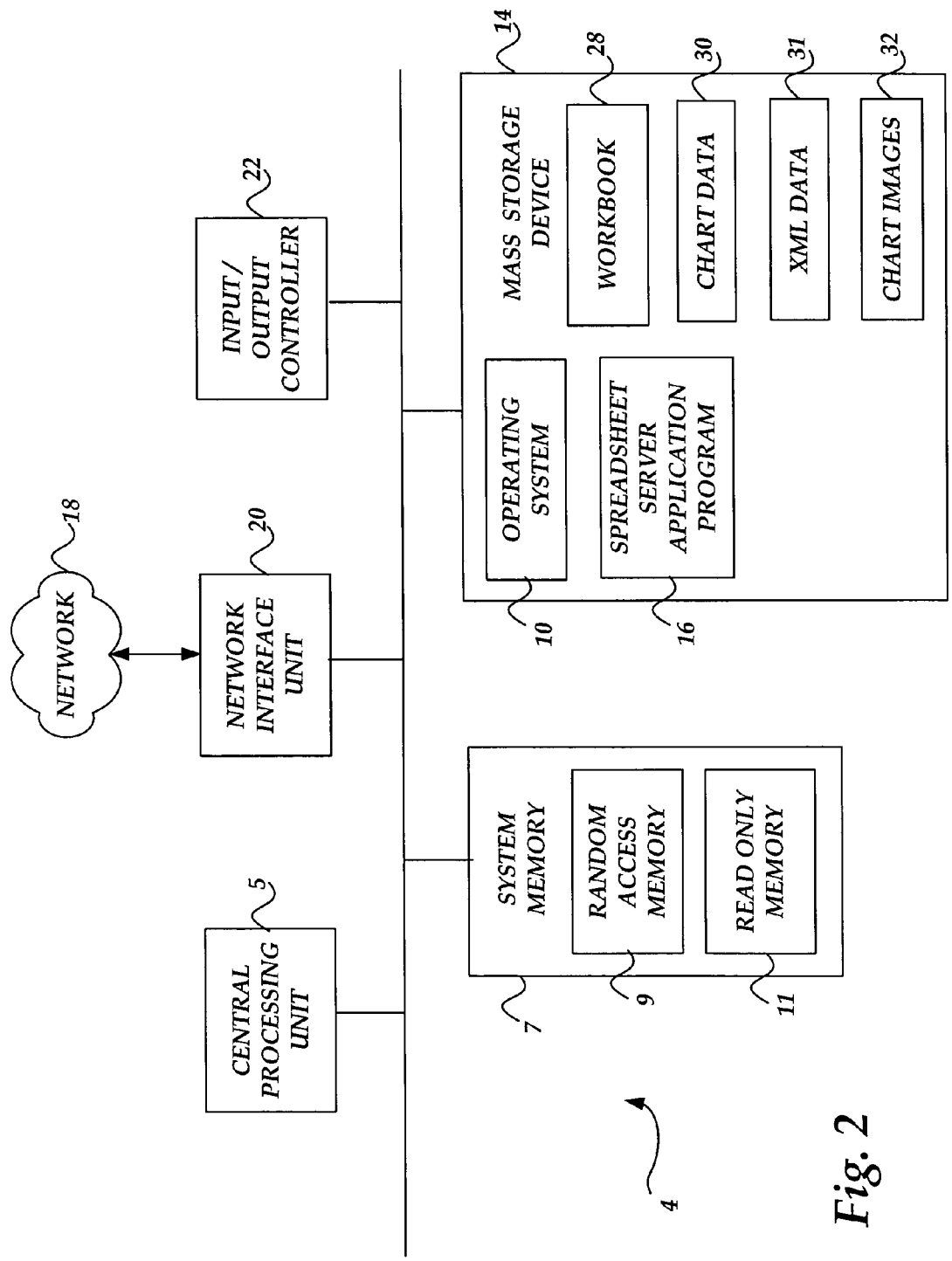
FIG. 2 is a computer system architecture diagram illustrating aspects of a server computer system utilized in and provided by the various embodiments of the invention.

Referring now to FIG. 2, an illustrative computer architecture for the server computer 4 utilized in the various embodiments of the invention will be described. The computer architecture shown in FIG. 2 illustrates a conventional server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 4 further includes a mass storage device 14 for storing an operating system 10, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 4. Although the description of computer-readable media contained herein refers to a mass storage device, such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 4.

According to various embodiments of the invention, the computer 4 may operate in a networked environment using logical connections to remote computers through a network 18, such as the Internet. The computer 4 may connect to the network 18 through a network interface unit 20 connected to the bus 12. It should be appreciated that the network interface unit 20 may also be utilized to connect to other types of networks and remote computer systems. The computer 4 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device. It should be appreciated that the client computer 2 may include many of the conventional computing components illustrated in FIG. 2 and described above.

As mentioned briefly above, a number of program modules and data files may be stored in the mass storage device 14 and RAM 9 of the computer 4, including an operating system 10 suitable for controlling the operation of a networked personal computer, such as the WINDOWS 2003 SERVER operating system from MICROSOFT CORPORATION of Redmond, Wash. Additionally, the mass storage device 14 and the RAM 9 may store the spreadsheet server application 16, a workbook 28, chart data 30, extensible markup language ("XML") data 31, and chart images 32.

The client spreadsheet application 6 may be utilized to create a workbook 28. The workbook 28 is a file that is created by a spreadsheet program that contains one or more worksheets (a worksheet may also be referred to herein as a "spreadsheet"). A worksheet is a single page organized into rows and columns within the spreadsheet program and appearing on screen and used for constructing a single table. Worksheets within the workbook 28 may include one or more cells of data (i.e., chart data) from which a chart may be calculated and rendered by the spreadsheet server application 16. Once a chart is rendered from data in the workbook 28, the spreadsheet server application 16 may store the rendered chart in the chart images file 32. It will be appreciated that spreadsheet application server program 16 may save the charts to the chart images file 32 in a file format (e.g., .PNG) that may be displayed in a browser program over the network 18.

The chart data 30 is a file in which the spreadsheet server application 16 may store data for generating one or more charts saved in the chart images file 32. It will be appreciated that in the various embodiments of the invention the chart data 30 may include individual chart series points and values associated with the chart series points. The chart data 30 may also include pivotChart data. The XML data file 31 comprises an XML representation of a chart including cell references in a workbook, individual chart series points and their values, and pivotChart data. As is understood by those skilled in the art, XML is a standard format for communicating data. In the XML data format, a schema is used to provide XML data with a set of grammatical and data type rules governing the types and structure of data that may be communicated. It should be understood that the XML representation for each chart is independent on the supporting data in a workbook. That is, all of the data needed by the spreadsheet server application 16 to render a chart will be included in the XML data file 31.

According to an illustrative embodiment of the invention, the spreadsheet server application 16 is operative to calculate an identifier for XML representation chart data and utilize the identifier to determine if a previously rendered chart image has been changed. A process for determining if a previously rendered chart image has been changed will be described in greater detail below with respect to FIG. 5.

Figure 3:
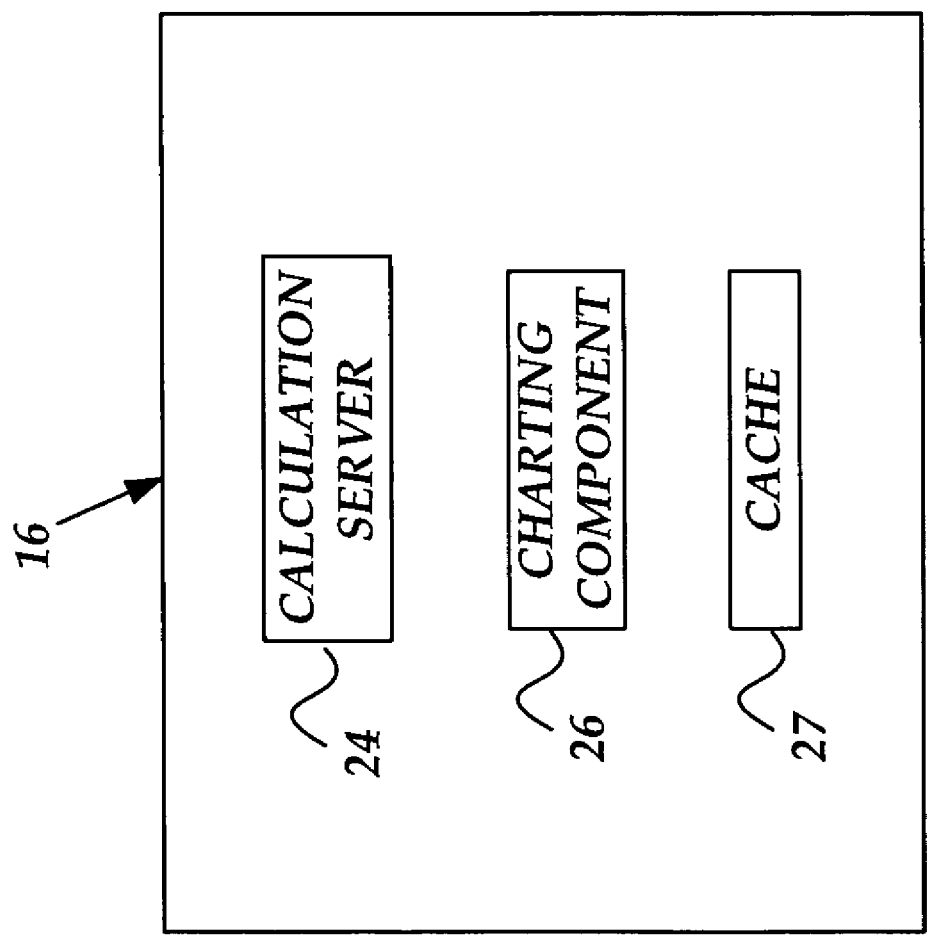
FIG. 3 is a block diagram illustrating components of a server spreadsheet application which may be utilized and provided by the various embodiments of the invention.

Referring not to FIG. 3, a block diagram showing various software components of the spreadsheet server application 16 according to an illustrative embodiment of the invention will be described. The spreadsheet server application 16 comprises a calculation server component 24, a charting component 26, and a cache 27. In the various embodiments of the invention, the calculation server component 24 is used to calculate chart data for rendering a chart image, generate an XML representation of the chart data, and calculate an identifier for the XML representation of the chart data. It will be appreciated that the identifier may be a hash value calculated from the chart data by the calculation server component 24. As is known to those skilled in the art, a hash is a number generated from a string of text which may be used to access data methods. The hash (or hash value) is generated by a formula in such a way that it is extremely unlikely that some other text will produce the same hash value. Various methods for generating hash values are well-known to those skilled in the art, and therefore not discussed in further detail herein. The calculation server component 24 is also operative to store the XML representation of the chart data and the identifier in the cache 27 for retrieval by the charting component 26.

The charting component 26 receives the XML representation of the chart data and the identifier from the calculation server component 24, via the cache 27, and compares the calculated identifier to a previously stored identifier on the server. The charting component 26 is also operative to retrieve previously chart images from the server as well as render chart images based on the XML representation of the chart data received from the calculation server. The cache 27 is further operative to cache the representation of the chart data and the calculated identifier. A process describing the use of the calculation server component 24, the charting component 26, and the cache 27 in determining whether to render a chart image will be described in greater detail below with respect to FIG. 5.

Figure 4:
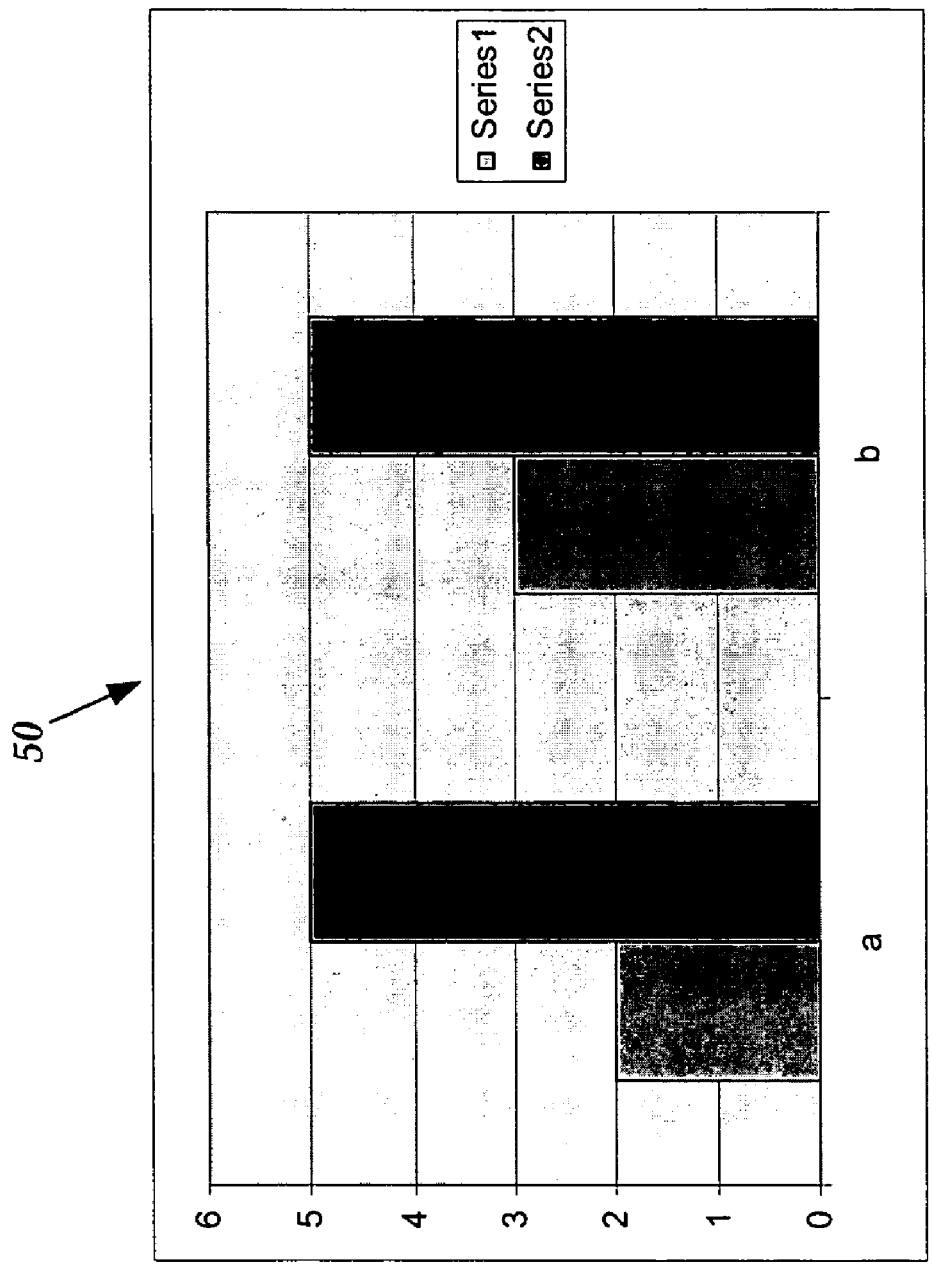
FIG. 4 is a chart which may be generated by the server spreadsheet application, according to an illustrative embodiment of the invention.

Referring now to FIG. 4, an illustrative chart 50 in accordance with an illustrative embodiment of the invention will be described. The chart 50 includes individual series points a and b and their values. The chart 50 may be stored as a chart image in the chart images file 32 on the server computer 4. As discussed above, the chart 50 may comprise one or more pivotCharts. Also as discussed above, the series points and their values may be stored as data in the XML data file 31. Using the data in the XML data file, the spreadsheet server application 16 may render the chart 50 for display.

Referring now to FIG. 5, an illustrative routine 500 will be described illustrating a process performed by the spreadsheet server application 16 for determining whether to reproduce chart images calculated from a workbook. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 5, the routine 500 begins at operation 505, wherein the server spreadsheet application 16 calculates chart data for rendering a chart from a workbook. In particular, the calculation server component 24 of the server spreadsheet application 16 may calculate series points and their values from the data in the cells of the workbook. The routine 500 continues at operation 510 where the server spreadsheet application 16 generates an XML representation of the chart data calculated at operation 505. In particular, the calculation server component 24 of the server spreadsheet application 16 generates an XML representation of the chart series points and their values as well as cell references from the chart data.

The routine 500 then continues at operation 515 where the calculation server component 24 of the spreadsheet application server 16 generates a hash value from the XML representation of the chart data. As discussed above, the hash value serves as a unique identifier for the chart data calculated from the workbook. The routine 500 continues at operation 520 where the calculation server component 24 saves the XML representation of the chart data and the generated hash value in the cache 27. As discussed above, the XML representation of the chart data and the hash value are retrieved by the charting component 26. The charting component 26 of the spreadsheet server application utilizes the hash value to determine if a chart image associated with the chart data has already been rendered.

The routine 500 continues at operation 525 where the charting component 26 compares the hash value generated by the calculation server component 24 to a previously stored hash value stored in the server 4. It will be appreciated that the previously stored hash value may be retrieved from the XML data file 31 which stores XML representations of chart data. The routine 500 continues at operation 530 where the charting component 26 matches the hash value generated by the calculation server component 24 and received from the cache 27, to one or more previously stored hash values stored in the server 4. If, at operation 530, the hash values match, the routine 500 continues to operation 535. If, at operation 530, the hash values do not match, the routine 500 continues to operation 540.

At operation 535, the charting component 26 retrieves a previously produced chart image based on the XML representation of the chart data associated with the hash value. In particular, the charting component 26 uses the hash value to determine the identity of a corresponding XML representation of a chart stored in the chart images file 32 on the server 4 and retrieves the chart image. The routine 500 then branches from operation 535 to operation 545.

At operation 540, the charting component 26 produces a chart image from the XML representation of the chart data stored in the cache 27 and generated by the calculation server component 24. In this manner, server resources are only utilized to produce chart images when necessary. The routine 500 then continues from operation 540 to operation 545.

At operation 545, the chart image which is retrieved or rendered by the charting component 26 is displayed. In particular, the charting component 26 may cause a chart image in one of a variety of known supported file types to be communicated from the spreadsheet server application 16 to a browser on a client computer connected to the network 18. The routine 500 then ends.

It will be appreciated that in the various embodiments of the invention, the charting component 26 will only render a chart image when the underlying data for the chart (i.e., the XML representation) has changed. As discussed above, if a request is received in the server for a chart where the underlying data has not changed, then the chart image is simply retrieved from a data storage. Based on the foregoing, it should be appreciated that the various embodiments of the invention include a method, system, and computer-readable medium for determining whether to reproduce a chart image from the contents of a spreadsheet application workbook on a server. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for determining whether to reproduce a chart image from the contents of a spreadsheet application workbook on a server, comprising:
    calculating chart data for rendering a chart image from workbook data retrieved from the spreadsheet application workbook;
    generating an extensible markup language (XML) representation of the chaff data;
    generating a hash value from the generated XML representation of the chart data;
    caching the XML representation of the chart data and the generated hash value, wherein the hash value serves as a unique identifier for the chart data calculated from the spreadsheet application workbook;
    calculating an identifier for the XML representation of the chart data, wherein the identifier is calculated from the XML representation of the chaff data including chart series points and chart series point values within the XML representation of the chart data;
    comparing the calculated identifier to a previously stored identifier on the server;
    if the calculated identifier is equal to the previously stored identifier, then retrieving a previously produced chaff image based on the XML representation of the chart data from the server;
    if the calculated identifier is not equal to the previously stored identifier, then producing a chaff image from the XML representation of the chart data; and
    displaying the chart image in a web browser on a client computer.

2. The method of claim 1 further comprising sending the chart image to a remote client and displaying the chart image on the remote client.

3. The method of claim 1, wherein the XML representation of the chart data comprises individual chart series points and values associated with the chart series points from a plurality of chart series.

4. The method of claim 1, wherein the chart data further comprises PivotChart data.

5. A system having at least one processor for determining whether to reproduce a chart image from the contents of a spreadsheet application workbook on a server computer, comprising:
    a server computer storing components, wherein the components include:
    a calculation server component for calculating chart data for defining a chart image from workbook data retrieved from the spreadsheet application workbook, generating an extensible markup language (XML) representation of the chart data, generating a hash value from the generated XML representation of the chart data, caching the XML representation of the chart data and the generated hash value, wherein the hash value serves as a unique identifier for the chart data calculated from the spreadsheet application workbook, and calculating an identifier for the XML representation of the chart data, wherein the identifier is calculated from the XML representation of the chart data including chart series points and chart series point values within the XML representation of the chart data; and
    a charting component for receiving the XML representation of the chart data and the identifier from the calculation server, the charting component further operative to compare the calculated identifier to a previously stored identifier on the server, if the calculated identifier is equal to the previously stored identifier, then retrieving a previously produced chart image based on the XML representation of the chart data from the server, if the calculated identifier is not equal to the previously stored identifier, then producing a chart image from the XML representation of the chart data, and
    displaying the chart image in a web browser on a client computer.

6. The system of claim 5, wherein the charting component displays the retrieved chart image in the web browser.

7. The system of claim 5, wherein the XML representation of the chart data comprises individual chart series points and values associated with the chart series points.

8. The system of claim 5, wherein the chart data further comprises pivotChart data.

9. A computer-readable storage, medium having computer-executable instructions stored thereon which, when executed by a computer, will cause the computer to perform a method for determining whether to reproduce a chart image from the contents of a spreadsheet application workbook on a sewer, comprising:

calculating chart data for rendering a chart image from workbook data retrieved from the spreadsheet application workbook;

generating an extensible markup language (XML) representation of the chart data;

generating a hash value from the generated XML representation of the chart data;

caching the XML representation of the chart data and the generated hash value, wherein the hash value serves as a unique identifier for the chart data calculated from the spreadsheet application workbook;

calculating an identifier for the XML representation of the chart data, wherein the identifier is calculated from the XML representation of the chart data including chart series points and chart series point values within the XML representation of the chart data;

comparing the calculated identifier to a previously stored identifier on the server;

if the calculated identifier is equal to the previously stored identifier, then retrieving a previously produced chart image based on the XML representation of the chart data from the server;

if the calculated identifier is not equal to the previously stored identifier, then producing a chart image from the XML representation of the chart data; and displaying the retrieved chart image in a web browser on a client computer.

10. The computer-readable storage- medium of claim 9, wherein the XML representation of the chart data comprises individual chart series points and values associated with the chart series points.

11. The computer-readable storage medium of claim 9, wherein the chart data comprises pivotChart data.

* * * * *